US009921852B2

(12) United States Patent
Chu et al.

(10) Patent No.: US 9,921,852 B2
(45) Date of Patent: Mar. 20, 2018

(54) OUT-OF-BAND RETRIEVAL OF NETWORK INTERFACE CONTROLLER INFORMATION

(71) Applicant: Quanta Computer Inc., Gueishan Dist., Taoyan (TW)

(72) Inventors: Hung-Lu Chu, Taoyuan (TW); Chin-Fu Tsai, Taoyuan (TW); Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/674,136

(22) Filed: Mar. 31, 2015

(65) Prior Publication Data
US 2016/0026477 A1  Jan. 28, 2016

(30) Foreign Application Priority Data
Jul. 22, 2014 (TW) .............................. 103125065 A

(51) Int. Cl.
*G06F 9/4401* (2018.01)
*G06F 9/44* (2018.01)
*G06F 11/22* (2006.01)

(52) U.S. Cl.
CPC .......... *G06F 9/4416* (2013.01); *G06F 9/4401* (2013.01); *G06F 9/4411* (2013.01); *G06F 11/2284* (2013.01)

(58) Field of Classification Search
None
See application file for complete search history.

(56) References Cited

U.S. PATENT DOCUMENTS 5,504,905 A * 4/1996 Cleary ................. G06F 9/4401
    713/100
7,543,277 B1 * 6/2009 Righi ................. G06F 11/3664
    709/221

(Continued)

FOREIGN PATENT DOCUMENTS

| JP | 2004295270 A | 10/2004 |
|---|---|---|
| JP | 2013539887 A | 10/2013 |
| WO | 2012050590 | 4/2012 |

OTHER PUBLICATIONS

Riddoch et al., "A Low Overhead Application/Device-driver Interface", Retrieved from: http://www.cl.cam.ac.uk/research/dtg/publications/public/files/tr.2001.3.pdf (Dec. 31, 2010). (7 pages).

(Continued)

*Primary Examiner* — Paul J Yen
(74) *Attorney, Agent, or Firm* — Nixon Peabody LLP; Eduardo J. Quinones

(57) ABSTRACT

In some implementations, network interface controller (NIC) configuration information can be obtained from a NIC prior to booting up an operating system. For example, a Basic Input Output System (BIOS) can obtain the NIC configuration information from the NIC during the execution of a system check (e.g., Power-On Self-Test). A system controller can receive the NIC configuration information from the BIOS. The system controller can store the NIC configuration information in memory associated with the system controller. A management system can request the NIC configuration information from the system controller using an out-of-band communication channel. For example, the management system can send the request for NIC configuration information to the system controller prior to powering on a server using a dedicated network interface of the system controller.

20 Claims, 4 Drawing Sheets

(56) References Cited

U.S. PATENT DOCUMENTS

| | | | |
|---|---|---|---|
| 8,521,873 B2 | 8/2013 | Bhadri et al. | |
| 8,560,686 B2 | 10/2013 | Ramamurthy | |
| 8,838,757 B2* | 9/2014 | Temporelli | 709/222 |
| 8,856,518 B2 | 10/2014 | Sridharan et al. | |
| 2004/0153640 A1 | 8/2004 | Sugita et al. | |
| 2005/0249235 A1 | 11/2005 | Lee | |
| 2006/0242280 A1 | 10/2006 | Zimmer et al. | |
| 2008/0098321 A1 | 4/2008 | Krithivas | |
| 2009/0132799 A1* | 5/2009 | Brumley et al. | 713/100 |
| 2011/0093690 A1 | 4/2011 | Vyssotski et al. | |
| 2011/0292807 A1 | 12/2011 | Shah et al. | |
| 2012/0017011 A1 | 1/2012 | Edwards et al. | |
| 2012/0278599 A1 | 11/2012 | Nilakantan et al. | |
| 2013/0205063 A1 | 8/2013 | Zhang et al. | |
| 2013/0268744 A1 | 10/2013 | Chan et al. | |
| 2014/0195657 A1 | 7/2014 | Bhatia et al. | |
| 2014/0208133 A1 | 7/2014 | Gopal et al. | |
| 2014/0250292 A1 | 9/2014 | Edwards et al. | |
| 2014/0304832 A1* | 10/2014 | Graham | G06F 21/85 726/27 |

OTHER PUBLICATIONS

Office Action mailed in Taiwanese Application No. 1042149220 dated Nov. 4, 2015.
English-language summary of Office Action mailed in Taiwanese Application No. 1042149220 dated Nov. 4, 2015.
Extended European Search Report mailed in European Application No. 15164851.6 dated Dec. 18, 2015.
Japanese Office Action dated May 10, 2016 for counterpart Japanese application No. 2015-086868.

* cited by examiner

OUT-OF-BAND RETRIEVAL OF NETWORK INTERFACE CONTROLLER INFORMATION

CROSS-REFERENCE TO RELATED APPLICATIONS

This application claims priority to and the benefit of Taiwan Patent Application No. 103125065, filed Jul. 22, 2014, the contents of which are herein incorporated by reference in their entirety.

TECHNICAL FIELD

The disclosure generally relates to obtaining NIC configuration information of a network interface controller (NIC).

BACKGROUND

Conventionally, network interface controller (NIC) configuration information is obtained locally on a computing device using a local operating system. For example, the operating system can run on the computing device and be used to obtain and configure NIC configuration information of the NIC. However, if the computing device administrator wishes to obtain or configure NIC configuration information for the NIC, the administrator will often have to log in to the operating system of the computing device and use various system commands. In either case, the computing device and operating system must be running before the NIC configuration information can be obtained or configured for the NIC.

SUMMARY

In some implementations, network interface controller (NIC) configuration information can be obtained from a NIC prior to booting up an operating system. For example, a Basic Input Output System (BIOS) can obtain the NIC configuration information from the NIC during the execution of a system check (e.g., Power-On Self-Test). A system controller can receive the NIC configuration information from the BIOS. The system controller can store the NIC configuration information in memory associated with the system controller. A management system can request the NIC configuration information from the system controller using an out-of-band communication channel. For example, the management system can send the request for NIC configuration information to the system controller prior to powering on a server using a dedicated network interface of the system controller.

Particular implementations provide at least the following advantages: a system administrator can obtain NIC configuration information of a NIC (e.g., network adapter) prior to booting or while a computing device is in a low power state.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
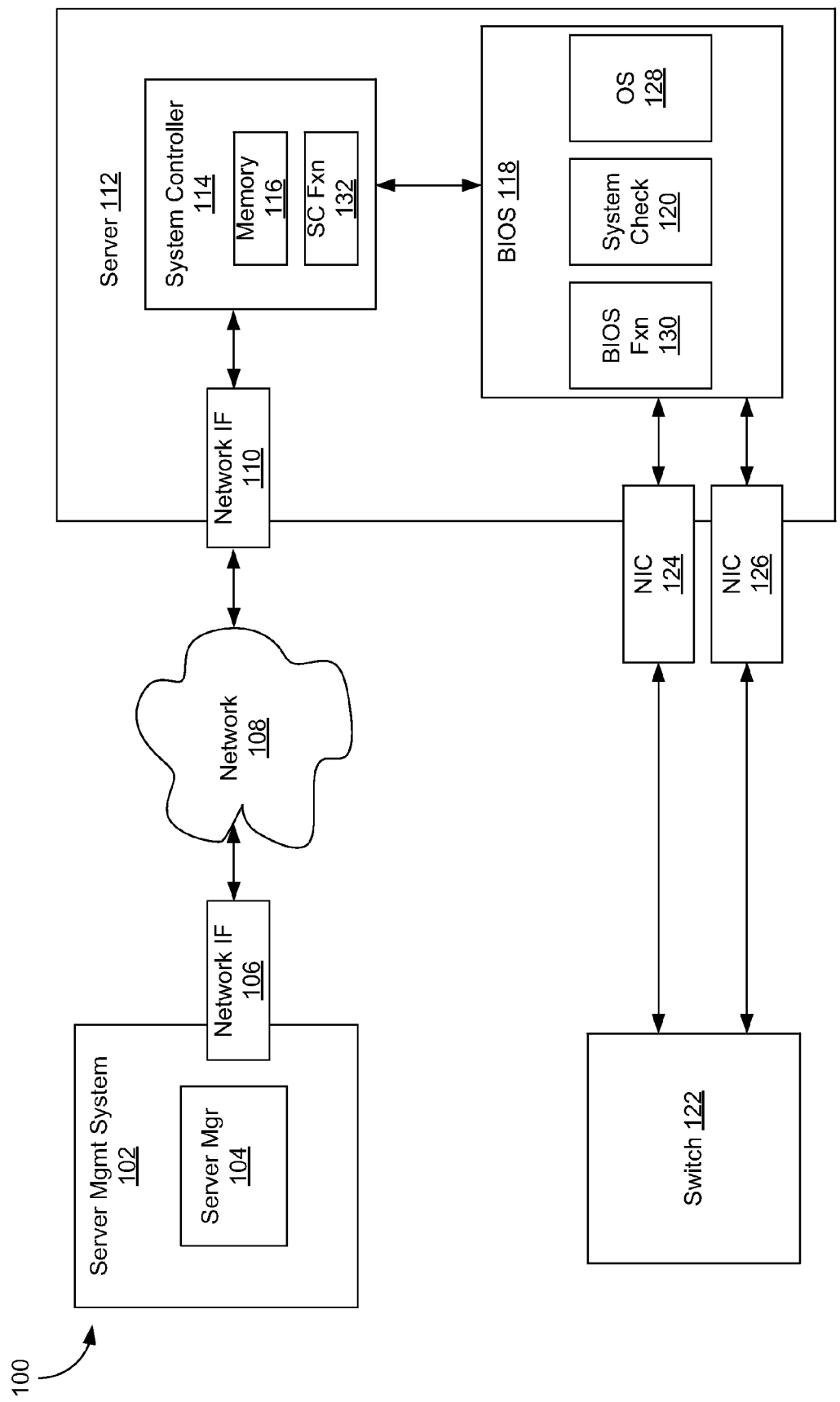
FIG. 1 illustrates a block diagram of example system for obtaining configuration information for a network interface controller of a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and members have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening members, and is not necessarily limited to physical connections. The connection can be such that the objects are permanently connected or releasably connected. The term "substantially" is defined to be essentially conforming to the particular dimension, shape or other word that substantially modifies, such that the member need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a block diagram of example system 100 for obtaining configuration information from a network interface controller of server 112. In some implementations, system 100 can include server 112. For example, server 112 can be any server known in the art, including, but not limited to, application servers, web servers, mail servers, mobile servers, file servers, host servers, rack mounted servers, etc. Server 112 can be one of many servers in a server rack, for example.

In some implementations, server 112 can include network interface controller 124 and network interface controller 126. NIC 124 and NIC 126 can have corresponding configuration data that describes the Slot ID, NIC type, Port Number, and/or MAC Address, of NICs 124 and 126. For example, a server administrator may need the NIC configuration information in order to configure server 112 on a network. For example, a server administrator may need to know the MAC address, port number, etc., to configure the Internet protocol (IP) address of the server so that the server can connect to and be accessed from a network (e.g., data center network, Internet, etc.). System 100 can provide a mechanism by which the system administrator can remotely retrieve the NIC configuration information from a server using an out-of-band connection to server 112, as described further below.

In some implementations, server 112 can include a Basic Input Output System (BIOS) 118 for obtaining the NIC configuration data. For example, BIOS 118 can be firmware stored on read-only memory (ROM) or Electrically Erasable Programmable Read-Only Memory (EEPROM), or the like, on a motherboard of a computing device. BIOS 118 can initialize and test hardware components of server 112, and can load a bootloader or an operating system from a mass memory device. BIOS 118 can provide an abstraction layer for the hardware thereby providing a consistent way for application programs and operating systems to interact with a keyboard, a display, and other input/output devices. In some implementations, a BIOS extension can be provided by or with peripheral devices (e.g., NICs, hard drive controllers, video display adapters, etc.), plug-in adapter cards such as SCSI, redundant array of independent disks (RAID), network interface cards, and video boards (e.g., video BIOS).

In some implementations, BIOS 118 can run system check 120 prior to booting up operating system (OS) 128. For example, OS 128 can be UNIX, versions of the Microsoft Windows® operating system, distributions of the Linux® operating system, or any operating system supporting the functions disclosed herein. System check 120 can be any diagnostic system examination executed during initialization of a computing device, such as a Power-On Self-Test (POST). The main duties of POST are handled by BIOS 118, which may hand some of these duties to other programs designed to initialize very specific peripheral devices, notably for video and small computer system interface (SCSI) initialization. The principal duties of the main BIOS during POST are to verify CPU registers, verify the integrity of the BIOS code itself, verify some basic components (e.g., direct memory access, timer, interrupt controller), find, size, and verify system main memory, initialize BIOS, pass control to other specialized extension BIOSes (if installed), and identify, organize, and select which devices are available for booting. POST can also be configured to discover, initialize, and catalog all system buses and devices, provide a user interface for system's configuration, and construct whatever system environment is required by the target operating system.

In some implementations, BIOS 118 can include BIOS function 130 for retrieving the NIC configuration information from NICs 124 and 126. For example, BIOS function 130 can be implemented in software or firmware configured on BIOS 118. In some implementations, while executing system check 120, BIOS function 130 can retrieve the NIC configuration information from NICs 124 and 126 (or memory associated with NICs 124 and 126). For example, the software (e.g., driver) for each NIC can provide an API for obtaining the configuration information for each NIC 124 and 126. The NIC configuration information can be stored in memory accessible to BIOS 118 such that BIOS function 130 can retrieve the NIC configuration information directly from memory. Once BIOS function 130 obtains the NIC configuration information, BIOS function 130 can send the NIC configuration information to system controller 114.

In some implementations, system controller 114 can be a microcontroller that operates independently of the CPU and operating system (OS) 128 of server 112. For example, system controller 114 can be a specialized service processor that runs independently of a CPU, such as a baseboard management controller (BMC).

In some implementations, system controller 114 can include system controller function 132. For example, system controller function 132 can be implemented in software or firmware configured on system controller 114. In some implementations, system controller function 132 can be configured to receive the NIC configuration information from BIOS 118 (e.g., BIOS function 130) and store the NIC configuration information into memory 116. Memory 116 can be any storage medium known in the art, including, but not limited to, non-volatile memory such as NVRAM, read-only memory, flash memory, FRAM, etc. In some implementations, system controller function 132 can operate independently of the other functions of system controller 114. For example, when system controller 114 is a BMC, the BMC's primary function is to monitor the physical state of server 112. As a result, system controller function 132 can operate independently of the BMC's monitoring functions.

In some implementations, system controller 114 can receive a request for NIC configuration information from server management system 102. For example, system controller 114 operates out-of-band, and so is adapted to function independently of OS 128. As such, system controller 114 is able to process the NIC configuration information request even though server 112 is not booted up or powered on. For example, system controller 114 can retrieve the NIC configuration information from memory 116. Alternatively, after booting up, system controller 114 can receive the NIC configuration information request from server management system 102 while server 112 is in a low power or idle state. For example, low power and idle states save power by halting instruction to stop a central processing unit (CPU) from functioning until an interruption occurs. Because system controller 114 operates out-of-band and independently of the operating system and the CPU (not shown), the configuration request can be received and processed without interrupting server 112 from the idle state.

In some implementations, system controller function 132 and BIOS function 130 can provide interfaces for sending/receiving the NIC configuration information as described in detail below. For example, BIOS function 130 can include interfaces for 1) detecting a NIC's configuration information, and 2) getting a NIC's configuration information. System controller function can include interfaces for 1) receiving the NIC configuration information, and 2) sending the NIC configuration information. For example, the request can be sent by a remote management system (e.g., server management system 102) to system controller 114 (e.g., system controller function 132) using the interface for getting (i.e., sending) the NIC configuration information. Since system controller 114 operates independently of OS 128, system controller 114 can send the NIC configuration information to server manager 104 before server 112 and OS 128 are booted up (e.g., before powered on, before initialized, while in a low power state, idle, etc.).

As described above, system controller 114 can receive a request for the NIC configuration information from server management system 102. Server management system 102 and system controller 114 can communicate with each other through network interface (IF) 106, 110. For example, the request for NIC configuration information can be sent using network interface 106, 110, which are coupled to network 108 (e.g. LAN, WLAN, WAN, Internet, etc.). Similarly, the NIC configuration information can be sent to server management system 102 from system controller 114 using network interface 106, 110. Network IF 110 can be a dedicated network IF of system controller 114 that allows for out-of-band communication between server management system 102 and system controller 114.

In some implementations, server management system 102 can include server manager 104. Server manager 104 can be a software application on server management system 102 that is operated by a system administrator. For example server manager 104 can provide a user interface that a system administrator can interact with to send a request for the NIC configuration information to system controller 114. In some implementations, server manager 104 can be configured to communicate with system controller 114 through system controller function 132. For example, a system administrator can send a request for NIC configuration information for NICs 124, 126 using server manager 104. Server manager 104 can be configured to send the request to system controller 114. For example, server manager 104 can send the request to system controller function 132 running on system controller 114. When system controller 114 receives the request for the NIC configuration information, system controller function 132 reads the NIC configuration information from memory 116 and sends the NIC configuration information to server manager 104 that is running on server management system 102.

In some implementations, once server management system 102 receives the NIC configuration information, the system administrator can configure server 112 using the NIC configuration information. For example, the server administrator can use server manager 104 to configure server 112 by sending server configuration information to system controller 114 through server manager 104. System controller 114 then configures server 112 according to the server configuration information.

In some implementations, server management system 102 can request the NIC configuration information from system controller 114 using an out-of-band communication channel (e.g., a connection using a dedicated channel independent of an operating system). For example, server management system 102 can send the request for NIC configuration information to system controller 114 prior to powering on server 112. System controller 114 can be configured to power on server 112. Because the NIC configuration information had already been saved to memory 116 during a prior boot, once server 112 is powered on, system controller function 132 recalls the NIC configuration information from memory 116 and sends the NIC configuration information to server management system 102 so that the system administrator can configure server 112.

As described above, server 112 can include NICs 124 and 126. NICs 124 and 126 can be any network adapter known in the art that allows computers to communicate over a computer network to allow users to connect to each other either by using cables or wirelessly. NICs 124 and 126 can support both a physical layer (e.g., open systems interconnection (OSI) layer) and a data link layer to provide physical access to a networking medium and, for IEEE 802 networks and Fiber Distributed Data Interface (FDDI), provide a low-level addressing system through the use of media access control (MAC) addresses. In some implementations, NICs 124 and 126 can be coupled to switch 122 (e.g. a top-of-rack switch) so that switch 122 can generate appropriate routing and forwarding tables. In some implementations a NIC may have a BIOS stored on ROM on the NIC.

In some implementations, server manager 104 can request NIC configuration information for more than one server. For simplicity, only one server is discussed and illustrated. However, it is understood that more than one server can be implemented in accordance with the teachings herein. For example, multiple servers, each with their own system controller, system controller function, memory, BIOS, BIOS function, system check, OS, and NICs are coupled to a single server management system through a network IF, each network IF being a dedicated IF for each server. The server management system, through the server manager, can send multiple requests to multiple system controllers (e.g. BMCs) to configure the NIC configuration information of the NICs of the multiple servers. This can be accomplished prior to booting up the servers, or while the servers are in a low power or idle state according to the teachings herein. Additionally, the teachings herein can be applied to a single NIC with one set of NIC configuration information on a single server, or to a plurality of NICs, each with its own set of NIC configuration information, that are all on a single server.

Figure 2:
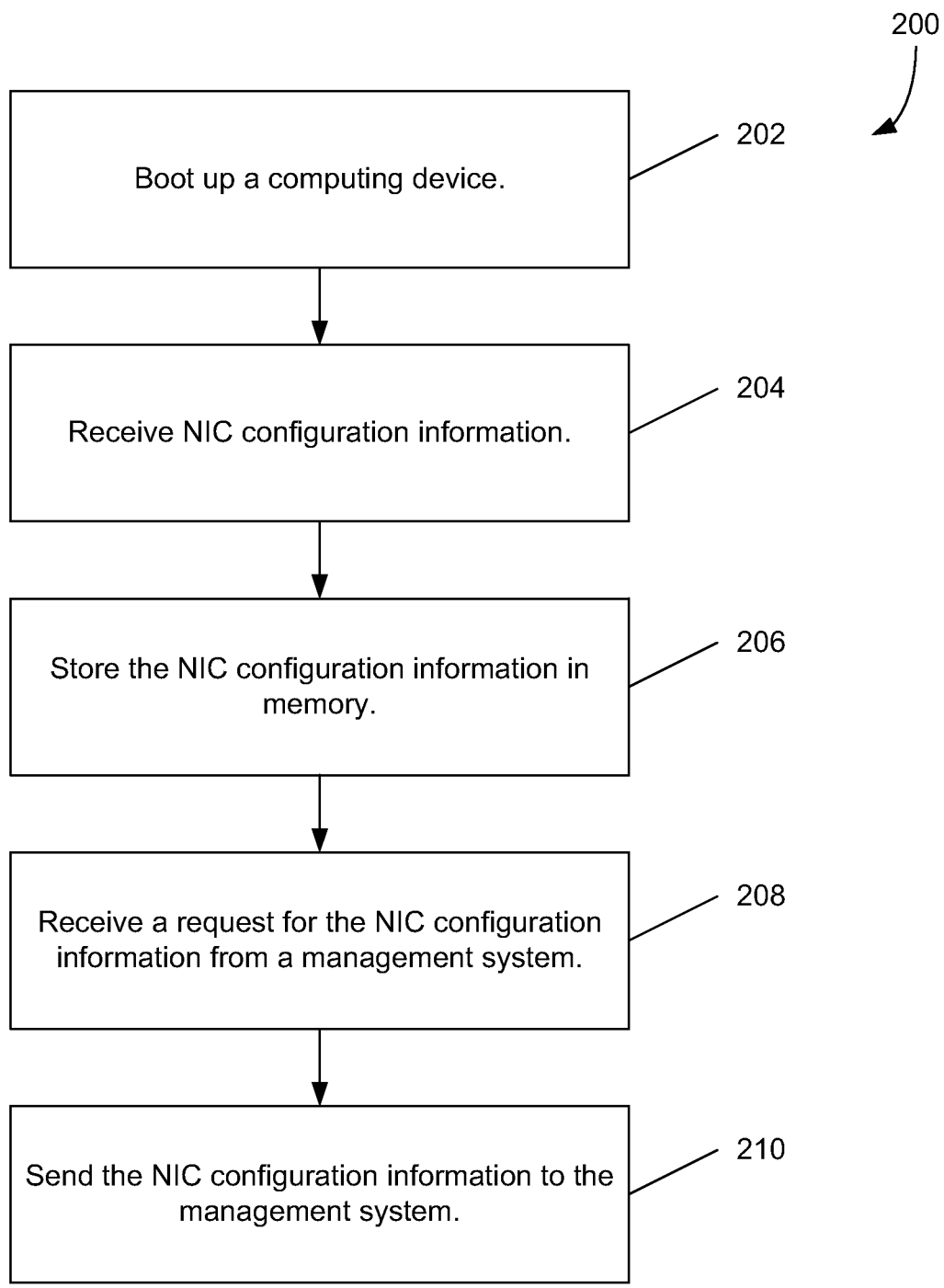
FIG. 2 is a flow diagram of an example process for obtaining configuration information for a network interface controller using a system controller.

Referring to FIGS. 1 and 2, FIG. 2 is a flow diagram of an example process 200 for obtaining configuration information for a network interface controller using a system controller. The method described below can be carried out using the configurations illustrated in FIG. 1, for example, and various elements of these figures are referenced in explaining the example method. Each block shown in FIG. 2 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method begins at block 202.

At block 202, server 112 is booted up. In some implementations, system controller 114 boots up server 112. For example, system controller 114 can receive a boot up request from server manager 104, causing system controller 114 to boot up server 112. The request can be received using an out-of-band communication channel (e.g., system controller dedicated network interface) that operates independently of the CPU. Thus, in some implementations, the request can be received by system controller 114 even while server 112 is powered down, idle, or otherwise not operational (e.g., the server has failed in some way).

At block 204, system controller 114 receives NIC configuration information for NICs 124 and 126. For example, system controller 114 can receive NIC configuration information from BIOS 118. In some implementations, BIOS 118 can obtain NIC configuration information from NICs 124 and 126 during system check 120. For example, system check 120 can be performed after booting up server 112 and prior to booting up OS 128. During this time, BIOS 118 obtains NIC configuration information from NICs 124 and 126. In some implementations system check 120 can be a POST performed by BIOS 118.

At block 206, system controller 114 stores the NIC configuration information in a storage associated with system controller 114. For example, system controller 114 can store the NIC configuration information in memory 116.

At block 208, system controller 114 receives a request from management system 102 for the NIC configuration information. For example, a system administrator can send a request for NIC configuration information for NICs 124, 126 using server manager 104. Server manager 104 can be configured to send the request to system controller 114. In some implementations, server manager 104 can be configured to communicate with system controller 114 through system controller function 132.

At block 210, system controller 114 sends the NIC configuration information to management system 102 in response to receiving the request for the NIC configuration information from management system 102. For example, system controller function 132 can read the NIC configuration information from memory 116 in response to receiving the request from management system 102, and send the NIC configuration information to management system 102.

In some implementations, NIC configuration information of NICs 124, 126 can be configured by receiving configuration information from server management system 102. For example, system controller function 132 can be configured to receive the configuration information from server management system 102 and send the configuration information to NICs 124, 126 through BIOS 118 to configure NICs 124, 126 according to the configuration information. System controller function 132 can also be configured to store the configuration information to memory 116.

Figure 3:
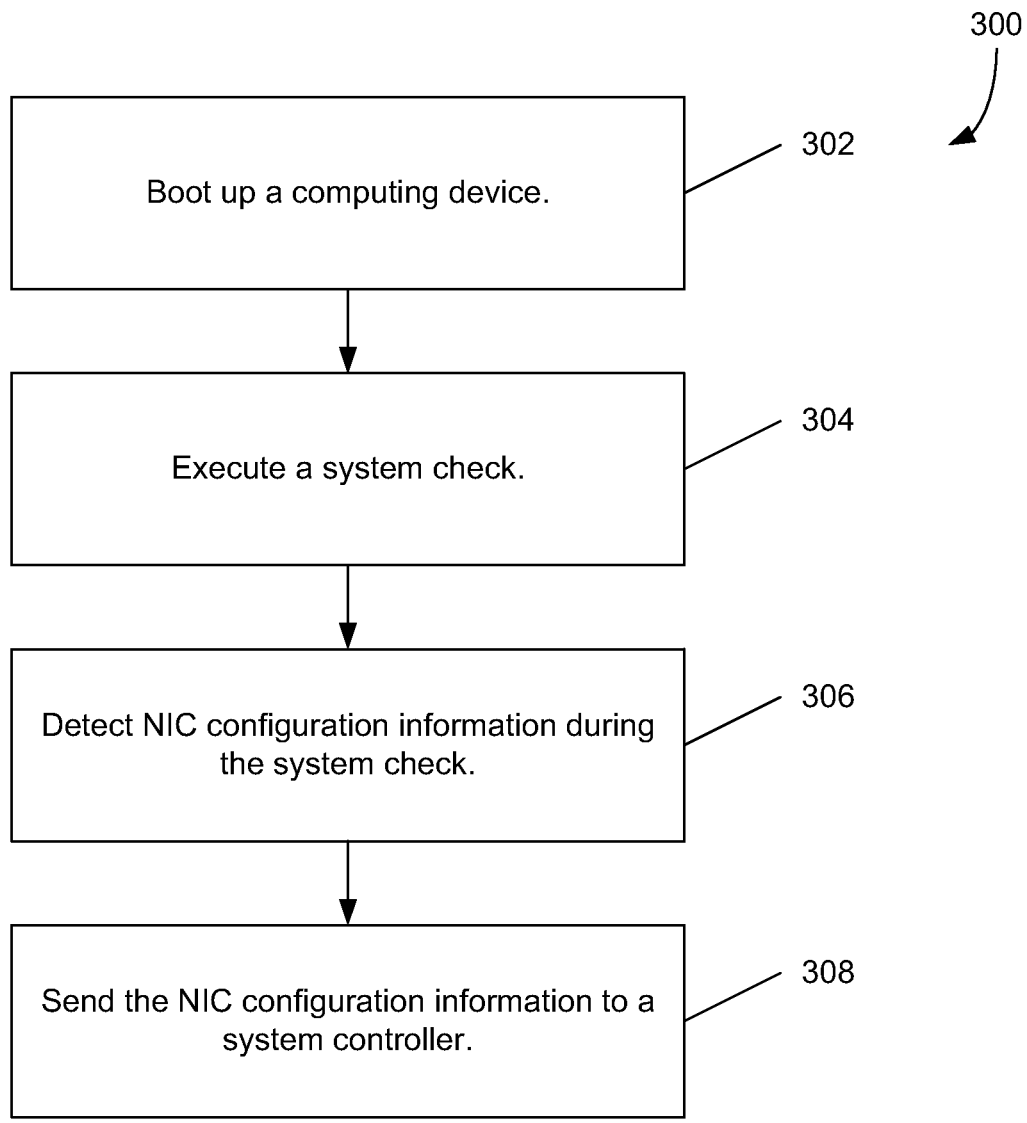
FIG. 3 is a flow diagram of an example process for obtaining configuration information for a network interface controller using a BIOS.

Referring to FIGS. 1 and 3, FIG. 3 is a flow diagram of an example process 300 for obtaining configuration information for a network interface controller using a BIOS. The method described below can be carried out using the configurations illustrated in FIG. 1, for example, and various elements of these figures are referenced in explaining the example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method begins at block 302.

At block 302, a computing device (e.g., server 112) is booted up. For example, an administrator can initiate booting up of server 112.

At block 304, a system check 120 is executed. For example, during booting up of the computing device, BIOS 118 can initialize and test the system hardware components. In some implementations, system check 120 can be performed after booting up server 112 and prior to booting up OS 128. In some implementations, BIOS 118 executes a POST.

At block 306, during the system check 120, BIOS 118 (e.g., BIOS function 130) detects NIC configuration information. For example, prior to completion of the POST, BIOS 118 (e.g., BIOS function 130) can detect NIC configuration information of NICs 124, 126. The NIC configuration information can then be stored in memory accessible to BIOS 118 such that BIOS function 130 can retrieve the NIC configuration information directly from the memory.

At block 308, BIOS 118 (e.g., BIOS function 130) sends the detected NIC configuration information to system controller 114 (e.g., system controller function 132), and system controller 114 saves the NIC configuration information to memory 116. In some implementations, BIOS function 130 causes BIOS to automatically detect and send the NIC configuration information of NICs 124, 126 to system controller 114 upon booting up of server 112.

Figure 4:
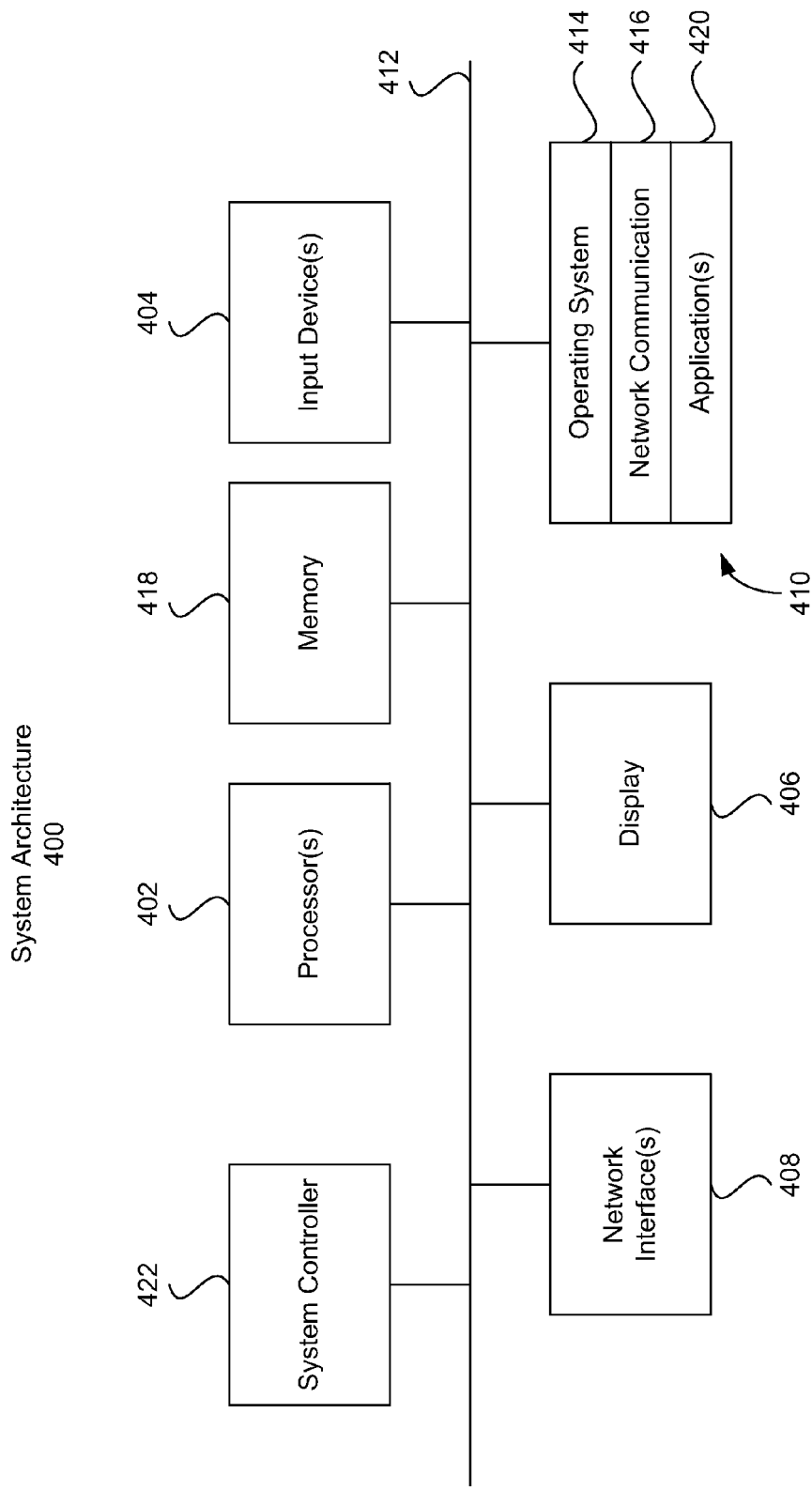
FIG. 4 is a block diagram of an example system architecture 400 implementing the features and processes of FIGS. 1-3.

FIG. 4 is a block diagram of an example system architecture 400 implementing the features and processes of FIGS. 1-3. The architecture 400 can be implemented on any electronic device that runs software applications derived from compiled instructions, including without limitation personal computers, servers, smart phones, media players, electronic tablets, game consoles, email devices, etc. In some implementations, the architecture 400 can include one or more processors 402, one or more input devices 404, one or more display devices 406, one or more network interfaces 408 and one or more computer-readable mediums 410. Each of these components can be coupled by bus 412.

In some implementations, system architecture 400 can correspond to a single server in a rack of servers. Various rack configurations can be implemented. For example, a rack can include multiple chassis and each chassis can contain multiple servers. Each server in the rack can be connected by various hardware components (e.g., backbone, middle plane, etc.). Each server in the rack can be connected to a network through a top-of-rack switch.

Display device 406 can be any known display technology, including but not limited to display devices using Liquid Crystal Display (LCD) or Light Emitting Diode (LED) technology. Processor(s) 402 can use any known processor technology, including but are not limited to graphics processors and multi-core processors. Input device 404 can be any known input device technology, including but not limited to a keyboard (including a virtual keyboard), mouse, track ball, and touch-sensitive pad or display. Bus 412 can be any known internal or external bus technology, including but not limited to ISA, EISA, PCI, PCI Express, NuBus, USB, Serial ATA or FireWire.

Computer-readable medium 410 can be any medium that participates in providing instructions to processor(s) 402 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 410 can include various instructions for implementing operating system 414 (e.g., Mac OS®, Windows®, Linux, etc.) and applications 420 such as computer programs. The operating system can be multi-user, multiprocessing, multitasking, multithreading, real-time and the like. The operating system 414 performs basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Operating system 414 can include an agent (e.g., software application, utility, program, etc.) configured to request an IP address from system controller 422 and invoke operating system functions for configuring the server IP address based on the IP address received from the system controller 422, as described above with reference to FIGS. 1-3. Network communications instructions 416 can establish and maintain network connections (e.g., software for implementing communication protocols, such as TCP/IP, HTTP, Ethernet, etc.).

Memory 418 can include high-speed random access memory and/or non-volatile memory, such as one or more magnetic disk storage devices, one or more optical storage devices, and/or flash memory (e.g., NAND, NOR). The memory 418 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 418 can store an operating system, such as Darwin, RTXC, LINUX, UNIX, OS X, WINDOWS, or an embedded operating system such as VxWorks.

System controller 422 can be a service processor that operates independently of processor 402. In some implementations, system controller 422 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

In some implementations, the BMC runs independently of processor 402 and hence in the event of processor 402, memory 418 or any other hardware failure, the BMC can still provide services and remain functional. In some implementations, the BMC can start running as soon as a server is plugged into a power source (e.g., power supply unit, backup power unit, power distribution unit, etc.). For example, the power button on the front side of the blade does not turn on/off the BMC. The management connectivity to the BMC is through two BMC-dedicated 100BASE-T interfaces on the blade to the chassis' internal management. However at any given instance the connectivity to the BMC is only through one of the two 100BASE-T interfaces, the other one being redundant. A system administrator (e.g., using server manager 104) can interact (e.g., configure, monitor, etc.) with system controller 422 using the controller's intelligent platform management interface (IPMI). For example, the IPMI interface can be used to configure system controller 422 with the IP address for the server. Alternatively, system controller 422 can be configured (e.g., with software, firmware, etc.) with a non-IMPI interface (e.g., custom interface) that allows a system administrator to remotely configure the server's IP address using system controller 422.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   booting up a computing device;
   detecting, by a basic input output system (BIOS) of the computing device, network interface controller (NIC) configuration information;
   getting, by the BIOS, the NIC configuration information;
   while the CPU of the computing device is powered down or in a low power state, receiving, at a system controller, the NIC configuration information from the BIOS through a system function of the system controller, the system function operable independently of an operating system on the computing device and having a system interface configured to receive the NIC configuration information and send the NIC configuration information, the system function being operational in an event that the computing device is powered off, the system controller being operational independently from a CPU of the computing device and the operating system;
   storing, at the system controller, the NIC configuration information in a memory of the system controller;
   receiving, from a remote management system, a request for the NIC configuration information; retrieving the NIC configuration from the memory of the system controller; and sending the NIC configuration information to the remote management system; and
   causing the remote management system to receive the NIC configuration information, prepare to configure the computing device using the NIC configuration information, and send the NIC configuration information back to the system controller to configure the computing device, while the CPU of the computing device is powered down or in the low power state.

2. The method of claim 1, further comprising:
   before booting up the computing device, receiving, at the system controller of the computing device, a request for the NIC configuration information of the computing device.

3. The method of claim 1 wherein the NIC configuration information is obtained by the BIOS during a system check of the computing device.

4. The method of claim 3 wherein the BIOS obtains the NIC configuration information from a NIC.

5. The method of claim 3 wherein the system check is a power-on self-test (POST).

6. The method of claim 1 wherein the NIC configuration information comprises information regarding a NIC.

7. The method of claim 1 further comprising:
   configuring the computing device at the management system using the NIC configuration information.

8. The method of claim 1 wherein the system controller comprises a baseboard management controller (BMC).

9. The method of claim 1 wherein the computing device is a server.

10. An apparatus comprising:
    a baseboard management controller (BMC) coupled to a management system using a dedicated channel independent of an operating system on the apparatus;
    a basic input output system (BIOS); and
    a non-transitory computer-readable medium including one or more sequences of instructions which when executed by the BMC causes the BMC to:
    boot up the apparatus;
    detect, by the BIOS, network interface controller (NIC) configuration information;
    get, by the BIOS, the NIC configuration information;
    while the CPU of the apparatus is powered down or in a low power state, receive, at the BMC, the NIC configuration information from the BIOS through a system function of the BMC, the system function operable independently of an operating system on the apparatus and having a system interface configured to receive the NIC configuration information and send the NIC configuration information, the system function being operational in an event that the apparatus is powered off, the BMC being operational independently from a CPU of the apparatus and the operating system; store, at the BMC, the NIC configuration information in a memory of the BMC; receive, from a remote management system, a request for the NIC configuration information; retrieve the NIC configuration from the memory of the BMC; and send the NIC configuration information to the remote management system; and
    cause the remote management system to receive the NIC configuration information, prepare to configure the apparatus using the NIC configuration information, and send the NIC configuration information back to the system controller to configure the apparatus, while the CPU of the apparatus is powered down or in the low power state.

11. A method comprising:
    booting up a computing device;
    during booting up of the computing device, detecting network interface controller (NIC) configuration information of the computing device by a basic input output system (BIOS);
    getting, by the BIOS, the NIC configuration information; and
    sending, by the BIOS, the NIC configuration information of the computing device to a system controller, wherein the system controller is configured to:
    while the CPU of the computing device is powered down or in a low power state, receive the NIC configuration information through a system function of the system controller, the system function operable independently of an operating system on the computing device and having a system interface configured to receive the NIC configuration information and send the NIC configuration information, the system function being operational in an event that the computing device is powered off, the system controller being operational independently from a CPU of the computing device and the operating system; store the NIC configuration information in a memory of the system controller; receive, from a remote management system, a request for the NIC configuration information; retrieve the NIC configuration from the memory of the system controller; send the NIC configuration information to the remote management system; and cause the remote management system to receive the NIC configuration information, prepare to configure the computing device using the NIC configuration information, and send the NIC configuration information back to the system controller to configure the computing device.

12. The method of claim 11 further comprising:
prior to initializing the operating system, receiving at the system controller a NIC configuration information request.

13. The method of claim 11 further comprising:
executing a system check during initialization.

14. The method of claim 13 wherein the detecting NIC configuration information occurs prior to completion of the system check.

15. The method of claim 13 wherein the system check is a power-on self-test (POST).

16. The method of claim 11 further comprising:
configuring the computing device based on the NIC configuration information.

17. The method of claim 11 wherein the NIC configuration information comprises information regarding a NIC.

18. The method of claim 11 wherein the system controller comprises a baseboard management controller (BMC).

19. The method of claim 11 wherein the computing device is a server.

20. An apparatus comprising:
a baseboard management controller (BMC) coupled to a management system using a dedicated channel independent of an operating system on the apparatus;
a basic input output system (BIOS); and
a non-transitory computer-readable medium including one or more sequences of instructions which when executed by the BIOS causes the BIOS to:
boot up the apparatus;
during booting up of the apparatus, detect network interface controller (NIC) configuration information of the apparatus by the BIOS;
get, by the BIOS, the NIC configuration information; and
send, by the BIOS, the NIC configuration information of the apparatus to the BMC, wherein the BMC is configured to:
while the CPU of the apparatus is powered down or in a low power state, receive the NIC configuration information through a system function of the BMC, the system function operable independently of an operating system on the apparatus and having a system interface configured to receive the NIC configuration information and send the NIC configuration information, the system function being operational in an event that the apparatus is powered off, the BMC being operational independently from a CPU of the apparatus and the operating system; store the NIC configuration information in a memory of the BMC; receive, from a remote management system, a request for the NIC configuration information; retrieve, by the BMC, the NIC configuration from the memory of the BMC; send, by the BMC, the NIC configuration information to the remote management system; and cause the remote management system to receive the NIC configuration information, prepare to configure the apparatus using the NIC configuration information, and send the NIC configuration information back to the system controller to configure the apparatus.

* * * * *